United States Patent
Schneider et al.

(10) Patent No.: US 11,453,068 B2
(45) Date of Patent: Sep. 27, 2022

(54) CLAMPING APPARATUS

(71) Applicant: GLEASON-HURTH TOOLING GMBH, Munich (DE)

(72) Inventors: Christoph Schneider, Remseck (DE); Uwe Rusch, Ludwigsburg (DE)

(73) Assignee: GLEASON-HURTH TOOLING GMBH, Munich (DE)

(*) Notice: Subject to any disclaimer, the term of this patent is extended or adjusted under 35 U.S.C. 154(b) by 0 days.

(21) Appl. No.: 17/051,590

(22) PCT Filed: Apr. 25, 2019

(86) PCT No.: PCT/EP2019/060649
§ 371 (c)(1),
(2) Date: Oct. 29, 2020

(87) PCT Pub. No.: WO2019/214962
PCT Pub. Date: Nov. 14, 2019

(65) Prior Publication Data
US 2021/0138559 A1    May 13, 2021

(30) Foreign Application Priority Data

May 11, 2018    (DE) .......................... 102018003839.5

(51) Int. Cl.
*B23B 31/20* (2006.01)
*B23B 31/02* (2006.01)

(52) U.S. Cl.
CPC ........ *B23B 31/2073* (2021.01); *B23B 31/025* (2013.01); *B23B 31/207* (2013.01);
(Continued)

(58) Field of Classification Search
CPC . B23B 31/025; B23B 31/207; B23B 31/2073; B23B 2231/24; B23B 2270/30; Y10T 279/17307; Y10T 279/17529
See application file for complete search history.

(56) References Cited

U.S. PATENT DOCUMENTS 1,364,783 A    1/1921  Morgan
1,849,546 A *  3/1932  Lippard ............ B23B 31/16212
                                                   279/119

(Continued)

FOREIGN PATENT DOCUMENTS

DE          29606504 U1    8/1996
DE      202009004585 U1    7/2009

(Continued)

OTHER PUBLICATIONS

German Patent Office Search Report for DE 102018003839.5, dated Jan. 15, 2019, 10 pgs.

(Continued)

*Primary Examiner* — Eric A. Gates
(74) *Attorney, Agent, or Firm* — Robert L. McDowell

(57) ABSTRACT

The invention relates to a clamping apparatus (1) for clamping a workpiece (100), which is or is to be toothed and has an axis of rotation, onto a spindle, which can be rotationally driven and has a spindle axis defining an axial direction (A), with a clamping mechanism (20), which converts an axial force (FA) transferred via a force transfer device (10) into a clamping force (Fg) directed radially to the spindle axis, wherein the force transfer device (10) has a first section (12) movably guided by a guide arrangement (30) in relation to a movement having an axial direction component, wherein the first section (12) is segmented into several transfer elements (12a, 12b, 12c, 12d) spaced apart from one another in a circumferential direction.

10 Claims, 4 Drawing Sheets

Figure 1:
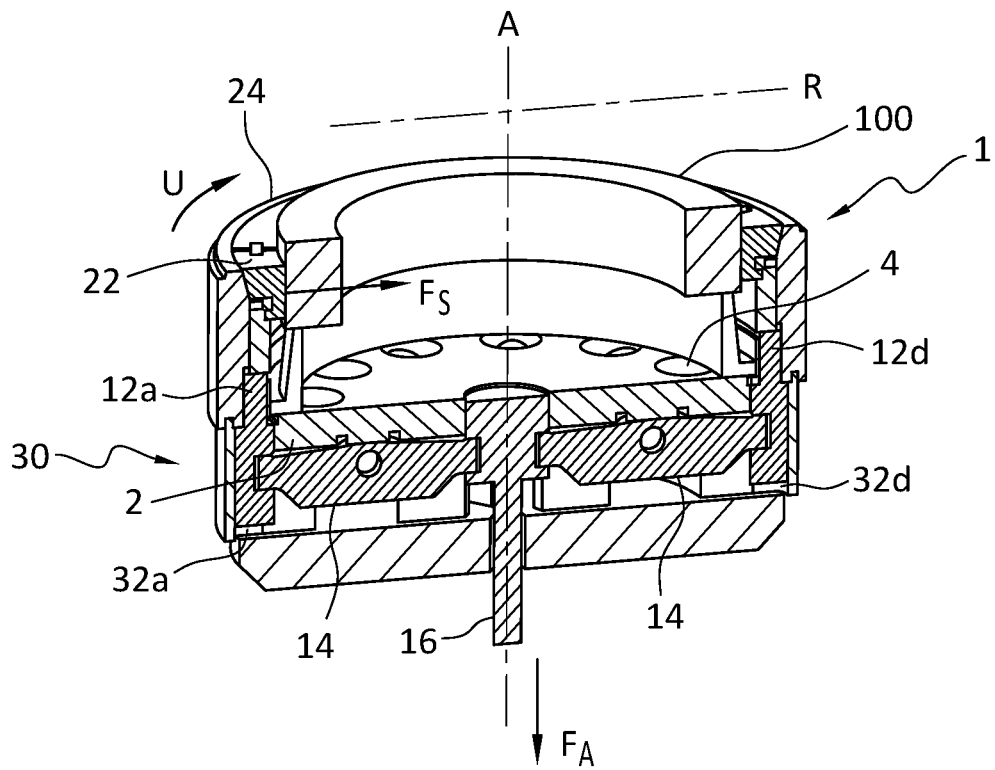

(52) U.S. Cl.
CPC ....... *B23B 2231/24* (2013.01); *B23B 2270/30* (2013.01); *Y10T 279/17307* (2015.01); *Y10T 279/17529* (2015.01)

(56) References Cited

U.S. PATENT DOCUMENTS

| | | | |
|---|---|---|---|
| 2,463,165 A | | 3/1949 | Felin et al. |
| 2,574,754 A | | 11/1951 | Peters |
| 2,859,041 A | | 11/1958 | Sloan |
| 3,179,429 A | * | 4/1965 | Dunham ............... B23B 31/207 279/50 |
| 4,513,980 A | * | 4/1985 | Kruse ................... B23B 31/202 279/123 |
| 4,856,797 A | * | 8/1989 | Rall ...................... B23B 31/202 279/54 |
| 5,429,376 A | | 7/1995 | Mueller et al. |
| 5,441,284 A | * | 8/1995 | Mueller ................ B23B 31/207 279/2.07 |
| 2002/0145261 A1 | | 10/2002 | Humphrey et al. |
| 2014/0203524 A1 | | 7/2014 | Hainbuch |

FOREIGN PATENT DOCUMENTS

| | | | |
|---|---|---|---|
| DE | 102013201071 B3 | 5/2014 |
| EP | 1101554 A1 | 5/2001 |
| GB | 2092034 A | 8/1982 |
| GB | 2362345 A | 11/2001 |

OTHER PUBLICATIONS

International Search Report and Written Opinion for PCT/EP2019/060649, ISA/EPO, dated Aug. 8, 2019, 16 pgs.

\* cited by examiner

CLAMPING APPARATUS

The invention relates to the field of gear machining and specifically to a clamping apparatus for clamping a workpiece, which is or is to be toothed and has an axis of rotation, onto a spindle, which can be rotationally driven and has a spindle axis defining an axial direction, with a clamping mechanism, which converts an axial force transferred via a force transfer device into a clamping force directed radially to the spindle axis, wherein the force transfer device has a first section movably guided by a guide arrangement in relation to a movement having an axial direction component, and also relates to a rotatable machine spindle with such a clamping apparatus and a gear cutting machine with such a clamping apparatus.

Such a clamping apparatus, in which an axial force is converted into a radial force for clamping the workpiece, is known from the prior art and is used, for example, together with a rotatable machine spindle of a gear cutting machine. The clamping mechanism of the clamping apparatus usually has a centering ring and a clamping ring, both of which have surfaces which run obliquely in the axial direction and are designed to be complementary to one another and which interact in such a way that a force acting on the clamping ring in the axial direction is converted into a clamping force acting radially with respect to the spindle axis. Depending on the design of the clamping mechanism, the clamping force can be directed inward in the radial direction or outward in the radial direction. The force acting in the axial direction is brought about by a force which acts on the clamping apparatus from outside and is transmitted to the clamping mechanism by a force transfer device. The force transfer device usually has a rigid, cup-like element which is connected to the tie rod in the center through a bore in the spindle. The rigid cup-like element couples to the clamping ring and the external force can act on the tie rod.

Such clamping apparatuses usually enable good clamping conditions and are easy to manufacture and to operate.

Workpieces with a clamping diameter of up to 850 mm, however, pose new challenges for the known clamping apparatuses.

The object of the present invention is to provide a clamping apparatus of the type mentioned at the outset, in particular for workpiece toothings with a large clamping diameter in which improved precision is made possible during clamping, nevertheless with a comparatively simple design.

This object is achieved by the invention by a further development of the clamping apparatus mentioned at the outset, which is substantially characterized in that the first section is segmented into a plurality of transfer elements spaced apart from one another in a circumferential direction.

The invention is thus based on a structure of the force transfer device that is completely different from the prior art explained above. Instead of a one-piece, rigid cup-shaped element, the force transfer device according to the invention has several, in particular three, four or more transfer elements spaced apart from one another in the circumferential direction. Thus, the force transfer device can be formed in particular in a cage-like structure. This enables an improvement in the guiding of the force transfer device in the guide arrangement. In particular, the risk of the force transmission device tilting in the guide arrangement and the force transfer device knocking against the guide arrangement is reduced.

The invention is based first of all on the knowledge that it is no longer possible to achieve clamping precision in a satisfactory manner with larger clamping diameters. In addition, the invention is based on the knowledge that an improvement in the guide ratio, i.e. the ratio of the length of the force transfer element guided by the guide and the effective diameter of the force transfer element, can be achieved by the individual transfer elements and such a design is possible despite the confined space of a clamping apparatus corotating with the spindle rotation. The effective diameter d is defined as follows: If F denotes the area dimension of an area extending perpendicularly to the axial direction and delimited by the force transfer element, the following relationship is produced between the area F and the effective diameter d: $F=\pi(d/2)^2$. With a round bolt, for example, the effective diameter d is equal to the diameter of the round bolt. In the case of a cup-shaped element the effective diameter thereof corresponds substantially to the clamping diameter of the workpiece to be clamped. These diameters can be 800 mm or more. As a result of the segmentation of the force transfer element, the effective diameter is now the effective diameter of the transfer elements, and thus is much smaller than the diameter of the workpiece. This significantly improves the guide ratio. Thus, the invention provides a clamping apparatus which has a structurally simple design and ensures high precision during clamping of a workpiece even with large clamping diameters, for example clamping diameters of more than 400 mm, also more than 500 mm, even more than 600 mm. Even applications of more than 700 mm or even more than 800 mm are conceivable, but currently common clamping diameters usually do not exceed 1,000 mm.

In one embodiment according to the invention, the guide arrangement has a plurality of guides assigned to the transfer elements and spaced apart from one another in the circumferential direction. Each transfer element is thus guided by its own guide. This leads to a further increase in the clamping precision.

At least one guide is preferably a three-point guide. Preferably, the angle of intersection of two straight lines running through the points of the three-point guide is always less than 90°. For a purely three-point guide, an equidistant arrangement offset by 120° with respect to the circumferential direction is preferred. This ensures precise guiding without the relevant transfer element coming out laterally.

In a further embodiment which is regarded as advantageous, the guide arrangement has a second section which extends at least partially in a direction running radially with respect to the spindle axis and is coupled to the first section. The second section can be designed in one piece. However, the second section can preferably be segmented corresponding to the first section. Material savings can be achieved in this way.

In the case of a segmented second section, it is preferable that the geometric moment of inertia with respect to an axial force load on a radially extending segment is greater than 200,000 mm$^4$, more preferably greater than 400,000 mm$^4$, in particular greater than 600.00 mm$^4$, For the associated moment of resistance, a minimum value of 10,000 mm$^3$, preferably 15,000 mm$^3$, in particular 24,000 mm$^3$, is preferably taken into account.

In a further embodiment of the invention, the clamping apparatus has a main body which in particular has at least one opening for chip removal. The main body can run parallel to the second section at least in sections. This design is particularly advantageous if, for an internal toothing, the workpiece is clamped by a radially inwardly directed clamping force. Then, through the at least one opening in the main body, chips produced during operation of the workpiece can pass from the inside of the clamping apparatus to the outside of the clamping apparatus. Preferably, at least one opening in the main body and an intermediate space between segments of the second and/or the first section define a passage from an inside of the clamping apparatus to an outside of the clamping apparatus. This enables reliable chip removal.

In a further embodiment according to the invention, the force transfer device can have a third section coupled to the second section. An external force can be coupled to the force transfer device via the third section. This external force can then be transmitted to the clamping mechanism via the second section and the first section. Preferably, the third section is at least partially rod-shaped, in particular in the form of a design of a pull/push rod which is known per se.

In a preferred embodiment, at least one transfer element has a length in the axial direction which is greater than an effective diameter of the transfer element, and in particular the transfer element is designed in the shape of a bolt. The effective diameter is defined as above. The bolt can be a round bolt. Such a transfer element is particularly easy to manufacture.

In a further embodiment of the invention, the second section can have a force reversing mechanism which reverses a tensile force or compressive force exerted on the third section into a compressive force or tensile force acting on the first section. Such a mechanism increases the flexibility in use of the clamping apparatus. The force reversing mechanism can be implemented, for example, by a tilting mechanism which ensures intermediate support in the second section.

It is thus provided that the greatest unsupported radial length of the axial force transmission in the second section is less than the radial distance between the first and third sections, in particular only at most 80%, preferably at most 72%, in particular at most 64% thereof.

In a preferred embodiment, the ratio of a length of the section of the transfer elements movably guided by the guide arrangement and the effective diameter of the transfer elements is greater than or equal to ½, preferably greater than or equal to 1, more preferably greater than or equal to 2, particularly preferably greater than or equal to 3. The above-mentioned ratios of the length of the guide and the effective diameter enable particularly precise guiding of the transfer elements of the force transfer device and thus particularly precise clamping of the workpiece.

In a further embodiment of the invention, the clamping mechanism can have an in particular segmented clamping ring which introduces the clamping force directly into the workpiece. The segmentation reduces the mechanical stresses that arise in the clamping ring during clamping.

For operation of a clamping apparatus according to the invention, a hydraulically applied axial force of at least 5,000 N, preferably at least 10,000 N, more preferably at least 18,000 N, particularly preferably at least 20,000 N, must be applied in particular to the third section. As a result, reliably stable clamping is achieved even at higher speeds and centrifugal forces. Even clamping forces of more than 30,000 N or more than 60,000 N, even more than 80,000 N are conceivable.

The invention not only provides protection for a clamping apparatus, but also a rotatable machine spindle with an above-mentioned clamping apparatus and a gear cutting machine with an above-mentioned clamping apparatus.

Figure 2:
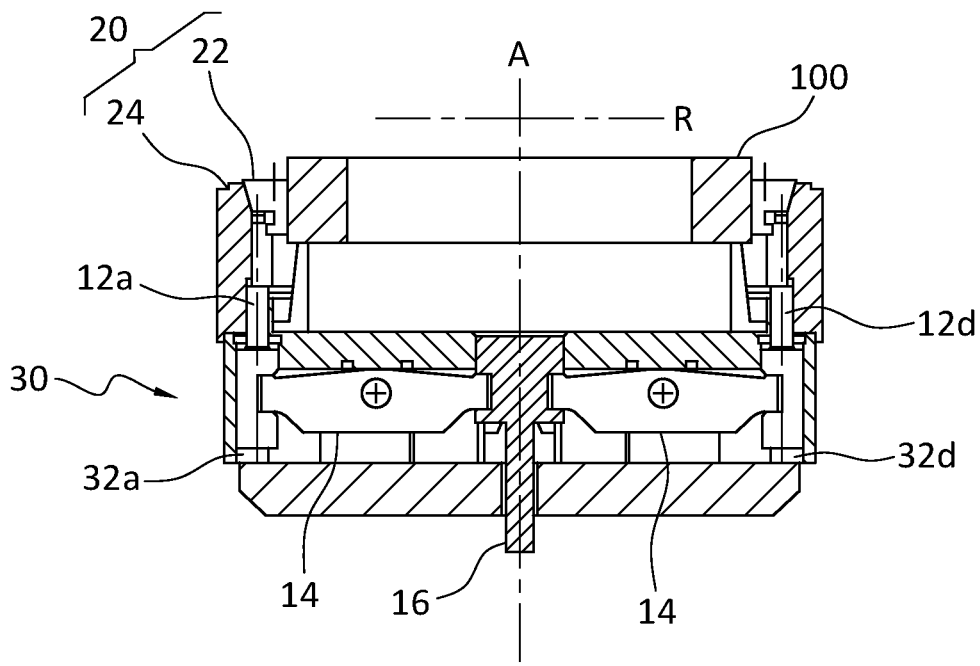
Figure 3:
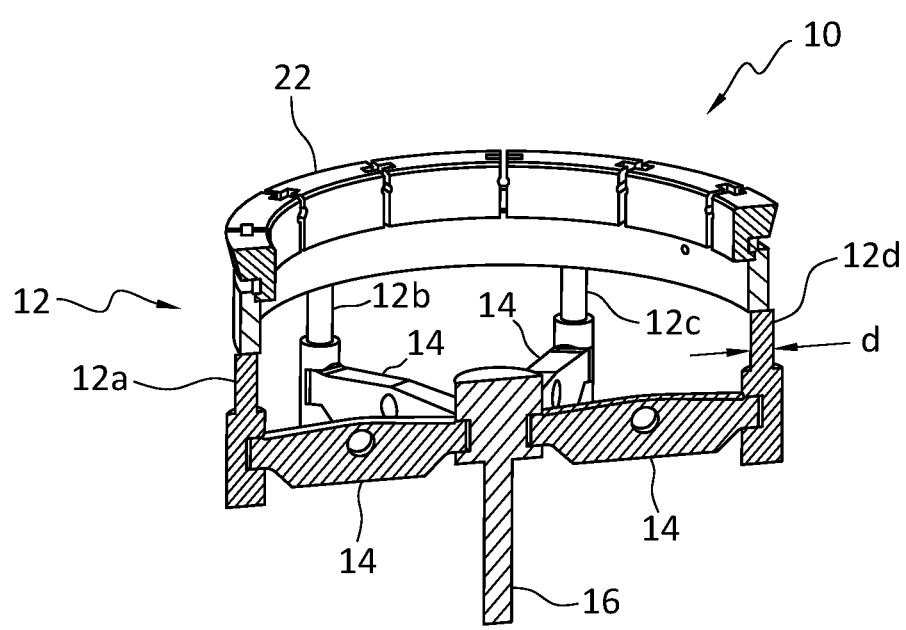
Figure 4:
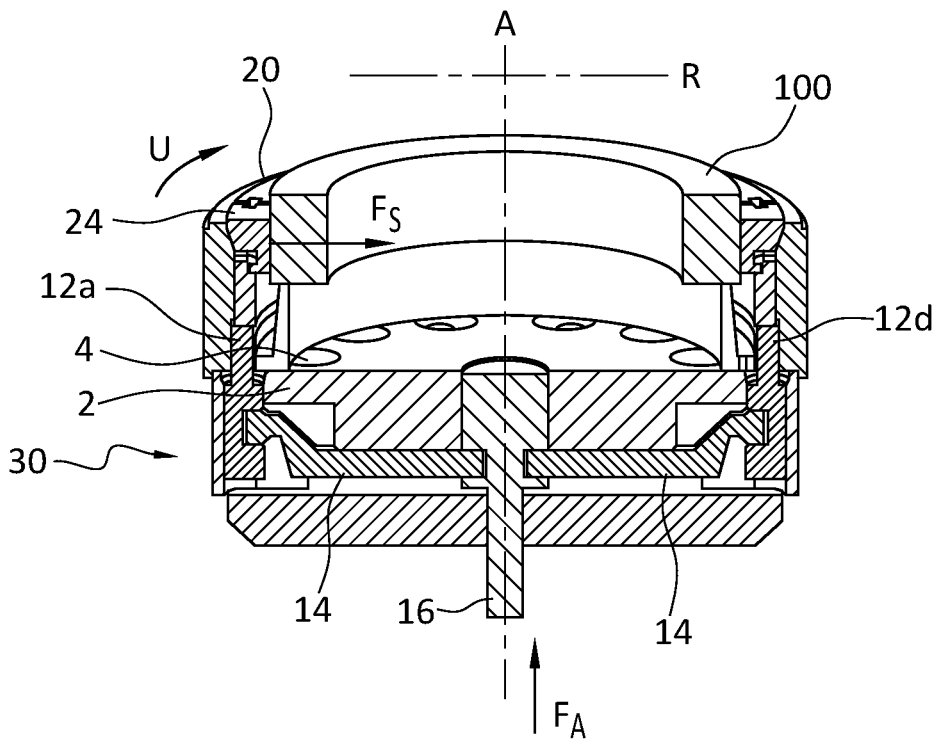
Figure 5:
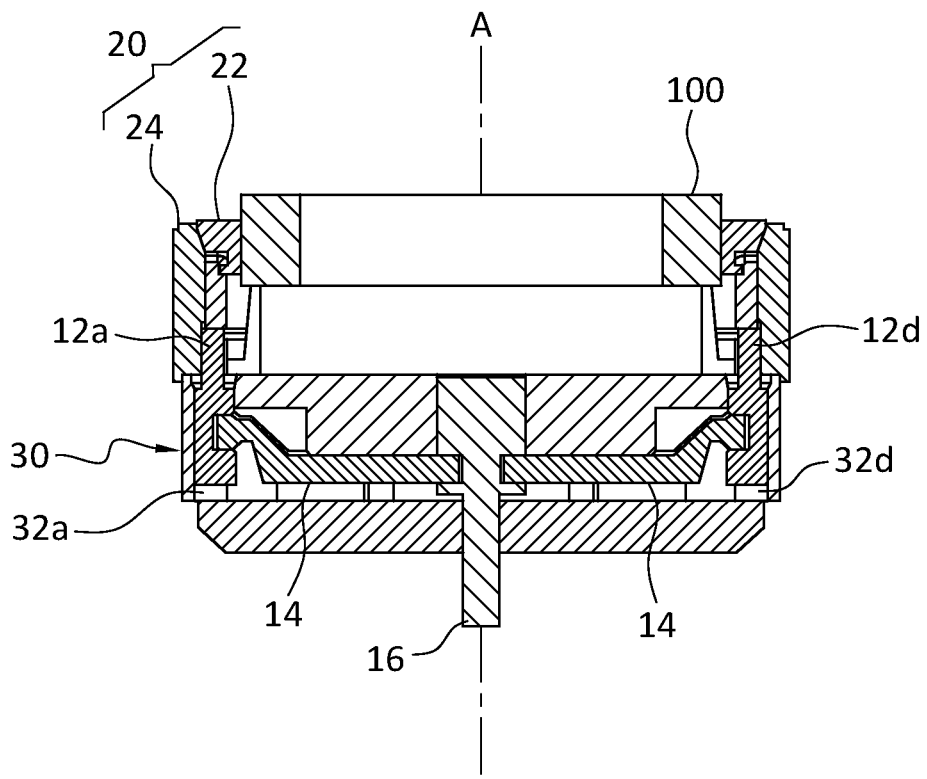
Figure 6:
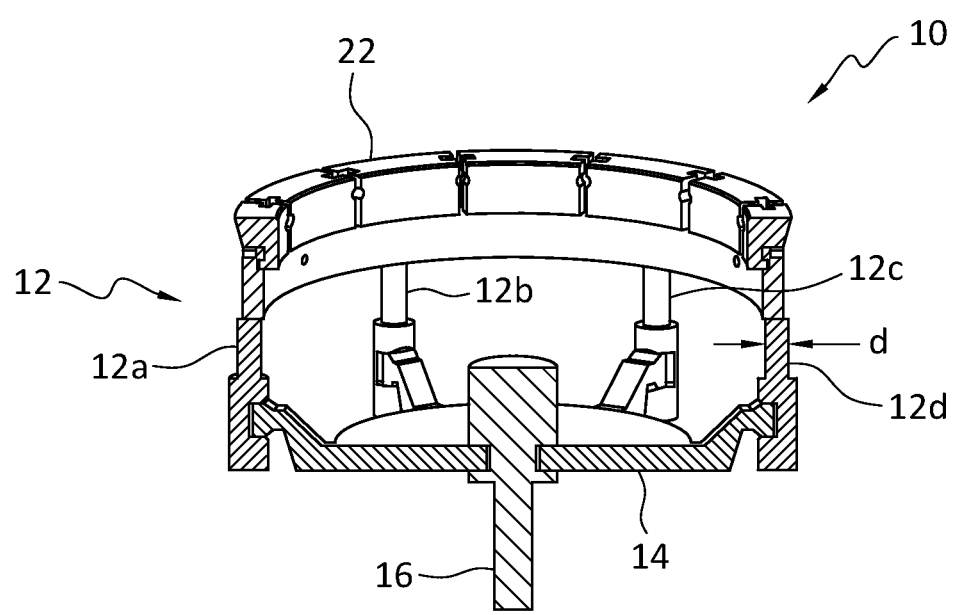

Further details, features and advantages of the invention can be found in the following description with reference to the accompanying drawings, in which FIG. 1 shows a perspective sectional view of a first embodiment of a clamping apparatus according to the invention, FIG. 2 shows a side sectional view of the clamping apparatus of FIG. 1, FIG. 3 shows the clamping mechanism and the force transfer device of the clamping apparatus shown in FIGS. 1 and 2, FIG. 4 shows a perspective view of a second embodiment of a clamping apparatus according to the invention, FIG. 5 shows a side sectional view of the tensioning device of FIG. 4, and FIG. 6 shows the clamping mechanism and the force transfer device of the tensioning device shown in FIGS. 4 and 5.

FIGS. 1 to 3 show views of a first embodiment of a clamping apparatus according to the invention and a force transfer device of such a clamping apparatus. FIG. 1 shows a perspective sectional view of the clamping apparatus 1 which clamps a workpiece 100. The workpiece 100 to be provided here with an internal toothing is inserted radially on the inside with respect to the clamping apparatus 1 and is thus clamped from radially outside. The clamping apparatus 1 according to the invention is not limited to this, however, and a clamping apparatus is also conceivable in which the workpiece 100 is placed radially on the outside with respect to the clamping apparatus 1 and the clamping force is exerted from radially inside.

The clamping apparatus 1 defines an axial direction A, a radial direction R running perpendicularly to the axial direction and a circumferential direction U running perpendicularly to the axial direction A and perpendicularly to the radial direction R.

The clamping apparatus 1 has a clamping mechanism 20, a force transfer device 10 and a guide arrangement 30.

The clamping mechanism 20 is used for clamping the workpiece 100. The clamping mechanism 20 is designed in such a way that it converts an axial force $F_a$ acting on it into a clamping force $F_s$ acting on the workpiece 100. The clamping force $F_s$ acts in the radial direction R. In the embodiment shown in FIG. 1, the clamping mechanism 20 has a clamping ring 22 and a centering ring 24. A first surface of the clamping ring 22 is in contact with the workpiece 100. A second surface of the clamping ring 22 is in contact with a third surface of the centering ring 24. The second surface of the clamping ring 22 is inclined in the axial direction A. The third surface of the centering ring 24 is designed to be complementary to the second surface of the clamping ring 22. If a force which is directed downwards in the axial direction now acts on the clamping ring 22, this force is converted by the second surface of the clamping ring 22 and the third surface of the centering ring 24 into a clamping force $F_s$, which is directed inward in the radial direction R. The workpiece 100 is clamped thereby. The clamping ring 22 can be segmented. This proves to be advantageous when high clamping forces are applied.

The force transfer device 10 has a first section 12, a second section 14 and a third section 16. The first section 12 extends in the axial direction A in FIG. 1. The first section 12 is segmented into several, in this case six transfer elements 12a, 12b, 12c, 12d which are arranged equidistantly in the circumferential direction and are spaced apart from one another in the circumferential direction U (and two which are not shown; only the transfer elements 12a, 12d can be seen in FIG. 1). In the embodiment shown in FIG. 1, the transfer elements 12a, 12d are bolt-shaped. The bolts have a diameter d which is equal to the effective diameter d of the bolts.

The second section 14 couples to the first section 12 and extends in the radial direction R. The second section 14 is segmented corresponding to the first section 12. Each segment of the second section 14 couples to a specific segment of the first section 12.

The third section 16 couples to the second section and extends in the axial direction A, In the embodiment shown in FIG. 1, the third section 16 is arranged in the middle of the main body 2. The third section 16 couples to all segments of the second section. In the embodiment shown, the third section 16 is rod-shaped. However, the third section 16 can also have a different shape. If a force Fa having an axial component is exerted on the third section 16, this force is transmitted to the clamping mechanism 20 via the second section 14 and the first section 12.

The second section 14 of the first embodiment has a force reversing mechanism. This can convert a compressive force acting on the third section 16 (force in the direction of the clamping apparatus 1) into a tensile force acting on the first section 12, and vice versa. However, the first embodiment can also be designed without the force reversing mechanism.

In the embodiment shown in FIG. 1, the main body 2 has openings 4 for chip removal. For this purpose, the openings 4 and the segments of the second section 12 are arranged in such a way that the openings 4 and the spaces between the segments define a passage from the inside to the outside of the clamping apparatus 1, However, the main body 2 can also be designed without the openings 4.

The guide arrangement 30 of the clamping apparatus 1 serves to guide the first section 12 of the force transfer device 10 in the axial direction A. In the embodiment shown in FIG. 1, all bolts 12a, 12b, 12c, 12d are guided by the guide arrangement 30. According to the first embodiment, the guide arrangement 30 has several, in this case six guides 32a, 32b, 32c, 32d arranged equidistantly in the circumferential direction U, of which only the guides 32a and 32d can be seen in FIG. 1 (two of the guides are not shown in the figures). In the embodiment shown, the guides 32 are each tubular, One guide 32a, 32b, 32c, 32d guides a bolt 12a, 12b, 12c, 12d in each case. However, the guides 32 are not limited to the embodiment shown in FIG. 1 and can also be configured differently, for example as a three-point guide. By guiding of each transfer element 12a, 12b, 12c, 12d in its own guide 32a, 32b, 32c, 32d, a particularly favorable guide ratio is achieved. As a result, particularly precise guiding of the first section 12 is achieved, whereby a high level of precision is achieved when clamping the workpiece 100. Such a clamping apparatus is particularly advantageous for workpieces 100 with a large clamping diameter.

FIG. 3 shows the force transfer device 10 with the clamping ring 22 of the clamping mechanism 20 of the first embodiment of the clamping apparatus 1 shown in FIGS. 1 and 2. The power transfer device 10 has a cage-like structure. In FIG. 3, the bolts 12a, 12b, 12c, 12d are connected to an annular element which in turn is connected to the clamping ring 22. Alternatively, however, the transfer elements 12a, 12b, 12c, 12d can also be connected directly to the clamping ring 22.

FIGS. 4 to 6 show a second embodiment of a clamping apparatus 1 according to the invention. The clamping mechanism 20, the main body 2, the guide arrangement 30 and the first section 12 and the third section 16 of the force transfer device 10 are designed as in the first embodiment and therefore the description thereof is not repeated. In contrast to the first embodiment, however, in the second embodiment the second section 14 of the force transfer device 10 is not segmented. Instead, the second section 14 has a disk-shaped region extending in the radial direction. This can be seen particularly clearly in FIG. 6. Furthermore, the second section 14 does not have a force reversing mechanism. Since the first section 12 of the force transfer device 10 and the guide arrangement 30 are designed as in the first embodiment, the second embodiment of the tensioning device 1 has advantageous effects like the tensioning device 1 of the first embodiment of the invention.

The invention claimed is:

1. A clamping apparatus (1) for clamping a workpiece (100), which is or is to be toothed and has an axis of rotation, onto a spindle, which can be rotationally driven and has a spindle axis defining an axial direction (A),
with a clamping mechanism (20), which converts an axial force ($F_a$) transferred via a force transfer device (10) into a clamping force ($F_s$) directed radially to the spindle axis, wherein the force transfer device (10) has a first section (12) movably guided by a guide arrangement (30) in relation to a movement having an axial direction component,
characterized in that the first section (12) is segmented into a plurality of transfer elements (12a, 12b, 12c, 12d) spaced apart from one another in a circumferential direction (U),
wherein the force transfer device (10) has a second section (14) which extends at least partially in a direction (R) running radially with respect to the spindle axis and which is coupled to the first section (12), wherein the second section (14) is segmented corresponding to the first section (12),
wherein the force transfer device (10) has a third section (16) coupled to the second section (14),
wherein the second section (14) has a force reversing mechanism which reverses a tensile force or compressive force exerted on the third section (16) into a compressive force or tensile force acting on the first section (12),
wherein the clamping mechanism (20) has a segmented clamping ring (22) which introduces the clamping force ($F_s$) directly into the workpiece (100).

2. The clamping apparatus (1) according to claim 1, in which the guide arrangement (30) has a plurality of guides (32a, 32d) assigned to the transfer elements (12a, 12b, 12c, 12d) and spaced apart in the circumferential direction (U).

3. The clamping apparatus (1) according to claim 2 wherein at least one of said transfer elements (12a, 12b, 12c, 12d) has a length in the axial direction which is greater than an effective diameter (d) of the transfer element.

4. The clamping apparatus (1) according to claim 3 wherein the transfer element (12a, 12b, 12c, 12d) is bolt-shaped.

5. The clamping apparatus (1) according to claim 2 wherein the ratio of a length of the section of the transfer elements (12a, 12b, 12c, 12d) movably guided by the guide arrangement (30) and the effective diameter (d) of the transfer elements (12a, 12b, 12c, 12d) is greater than or equal to ½.

6. The clamping apparatus (1) according to claim 1 wherein the clamping apparatus (1) has a main body (2) which has at least one opening (4) for chip removal.

7. The clamping apparatus (1) according to claim 6, wherein said at least one opening (4) in the main body (2) and an intermediate space between segments of the second and/or the first section (14) define a passage from an inside of the clamping apparatus (1) to an outside of the clamping apparatus (1).

8. The clamping apparatus (1) according to claim 1, wherein the third section (16) is at least partially rod-shaped.

9. The clamping apparatus (1) according to claim 1 wherein an axial force ($F_a$) of at least 5,000 N is necessary for operation of the clamping apparatus (1).

10. The clamping apparatus (1) according to claim 9 wherein axial force ($F_a$) is applied to the third section (16).

* * * * *